UNITED STATES PATENT OFFICE.

HEINRICH KRIEGSHEIM, OF NEW YORK, N. Y., ASSIGNOR TO THE PERMUTIT COMPANY, OF NEW YORK, N. Y., A CORPORATION OF DELAWARE.

MANUFACTURE OF BASE-EXCHANGING SILICATES.

1,208,797.     Specification of Letters Patent.     Patented Dec. 19, 1916.

No Drawing.     Application filed March 21, 1916. Serial No. 85,586.

*To all whom it may concern:*

Be it known that I, HEINRICH KRIEGSHEIM, a citizen of Germany, residing at New York, in the county of New York and State of New York, have invented certain new and useful Improvements in the Manufacture of Base-Exchanging Silicates, of which the following is a specification.

This invention relates to the manufacture of base exchanging silicates; and it comprises a method of making what are known as "artificial zeolites" or "base-exchanging silicates" wherein various leachings and mother liquors from the ordinary processes of manufacture are utilized in making such base exchanging silicates, as by fusing a mixture of various materials containing silica, alumina and alkali in the proper proportions for this purpose, (see Gans Reissue 13,688) extracting with water and employing the extracted liquid which contains alkali and silica, in the production of a precipitate of base exchanging silicate in the wet way, as by precipitating an alumina solution therewith, the mother liquor from such precipitation being further utilized to dissolve alumina, or the like, to produce another solution suitable for precipitation; all as more fully hereinafter set forth and as claimed.

As is now well known, base exchanging silicates, or what are termed artificial zeolites, may be prepared in various ways in order to furnish a material which used in a filter-like bed has the property of taking up lime or magnesia from hard water and substituting sodium in their lieu; this material being capable of revivification after use by treatment with a solution of sodium chlorid. Base exchanging silicates capable of many other functions than that of softening water may be prepared in like ways. When used in such a manner the material must of course have a number of united properties, both chemical and physical. It must have a high base exchanging power, which means that its chemical composition must be such as to render it highly reactive; it must have as large a surface as possible, (since this is largely a surface action) which in turn means it must be highly pervious; and at the same time it must have a high degree of rigidity and mechanical strength to resist the erosive and sliming-down action of the water when the material is used as a granular bed with a flowing stream of water. Such a union of characteristics it is of course rather hard to secure. In the best known methods now in use, a mixture of materials containing silica, alumina and alkali are melted together to form a glass. The particular character of these materials is not very important so long as they have the proper ratio of the substances mentioned; but in all cases the amount of alkali employed in the melt, whether this be potash or soda, is greater than that which is intended to remain in the finished product for the reason that the glassy product on subsequent granulation and leaching must become highly pervious and the presence of a certain amount of alkali susceptible of extraction by water gives the product this pervious nature. On granulating and leaching the glass, leaching and wash water are obtained which contain not only the alkali stated but also a considerable proportion of silica. A certain fraction of the silica in the materials originally employed re-appears in the leachings and wash waters in a dissolved form. In addition to the silica, there may be in the leachings various other components of the rocks or minerals used; but for the sake of simplicity hereinafter these leachings and extracts may be spoken of as if they contained substantially only silica and alkali without thereby necessarily meaning that this is the case.

In another method of making base exchanging silicates solutions of silicate of soda and aluminate of soda, (or sulfate of aluminum) are mixed together with the result of forming a precipitate containing alkali, silica and alumina. In this reaction, alkali is set free and remains in the solution. That is, silica combined with alkali and alumina combined with alkali on meeting in solution give a precipitate with the result of setting free a proportion of the alkali which held them in solution. The precipitate so obtained is flaky, gelatinous or pasty in its consistency and in such form has no value; but by proper methods of after treatment it may be converted into hard, rigid, pervious granules suitable for use. These methods of after treatment forming no part of the present invention need not be described here although it may be noted that in substance they consist in partially washing the precipitate so obtained so as to remove some but not all of the contained alkali and thereafter drying at a low temperature so as to remove some but not all of the water contained in a state of chemical combination and adsorbed.

I have found that these various methods of producing exchange silicates may be combined with notable economy of materials and a cheapening of the whole operation with the production of unusually advantageous materials. To this end, I may produce an exchange silicate in the dry way as by utilizing the method of Gans Reissue 13,688 and Reissue 13,691 or Duggan 1,116,038, leaching and otherwise treating in the known ways. The leachings and washing liquids I use in the present process. Where the original melt consisted in part of potassiferous materials such as feldspar, they will contain considerable amounts of potash. If the original melt contained soda as the only alkali, they contain sodium salts in lieu of potassium. Both potassium and sodium may be present. These liquids I treat with a soluble compound of alumina, such as sodium aluminate or sulfate of alumina; the former being preferable for reasons which will later appear.

Instead of a solution containing alumina I may, for various purposes, substitute solutions containing other colloid and amphoteric oxids such as the oxids of tin, titanium, chromium, lead, zinc, iron, etc. I shall however hereinafter describe more particularly this method as applied to the use of alumina since the alumina-containing zeolites are of more extended commercial use than those containing the other metals stated.

On admixture of the leachings or washings from the dry process with a solution of aluminate of soda the stated reaction occurs by which the alumina and the silica of the two solutions go down together, carrying with them a certain amount of the alkali and producing the stated gelatinous, flaky or pasty precipitate. This precipitate has base exchange properties and by an after treatment may be made of commercial value. In the reaction caustic alkali is set free and remains dissolved. This alkali solution may now be used to dissolve further alumina for the purpose of entering into another reaction. As it contains both alkali derived from the dry process leachings and the alkali entering with the aluminate, the amount of alkali is of course greater than is needed and the portion of the alkali in excess may be withdrawn from the system and used for other purposes. Where the original melts contain potash as they advantageously may, this withdrawal affords a possibility of recovering potash from natural silicates.

In a typical embodiment of the present process I may melt a mixture containing 3 parts kaolin, 6 parts quartz, either in the form of sand or rock quartz and 12 parts of sodium carbonate to make a glass; or I may use such a mixture as 56 parts of sodium carbonate (soda ash) 25 to 26 parts of feldspar, 12 parts kaolin and 6 or 7 parts of potassium carbonate. This glass is granulated and leached, which may be done in the ways described in Patent 1,116,038. The leachings, which contain silica and alkali are next mixed with a solution containing alumina; advantageously an alkaline aluminate. Acid or neutral solutions of alumina, though they may be used, do not give a mother liquor capable of reuse. While other strengths and other proportions may be used, I find it advantageous to use a solution containing alumina and soda in about the proportions of 30 pounds of $Al_2O_3$ and 18 pounds of $Na_2O$ in 1000 gallons of water, giving a 0.6 per cent. solution. Reaction at once occurs with the formation of a precipitate which is removed, partially washed and dried in the manner before noted. The mother liquor from this precipitate is rich in caustic alkali (potash or soda, or both) and may now be used for dissolving more alumina for the purpose of producing a new solution capable of entering into another reaction of the same kind. Obviously, the mother liquor containing caustic alkali and resulting from wet methods of making exchange silicates may also be reutilized for making sodium aluminate for another precipitation; and I regard such a reutilization of a caustic alkali solution coming from any wet process as being within the purview of the present invention.

What I claim is:—

1. In the manufacture of purifying materials, the process which comprises leaching with water an alkaline melt comprising silica and alumina and precipitating an alkaline solution of an amphoteric oxid with the leachings.

2. In the manufacture of purifying materials, the process which comprises leaching with water an alkaline melt comprising silica and alumina and precipitating a solution containing alumina with the leachings.

3. In the manufacture of purifying materials, the process which comprises leaching with water an alkaline melt comprising silica and alumina and precipitating an alkaline solution containing alumina with the leachings.

4. In the manufacture of purifying materials, the process which comprises leaching with water an alkaline melt containing silica and alumina, dissolving an amphoteric oxid with an alkali solution, and mingling the leachings and the solution to obtain a precipitate of a base-exchanging material.

5. In the manufacture of purifying materials, the process which comprises leaching with water an alkaline melt containing silica and alumina, dissolving alumina with an alkaline solution, and mingling the leachings and the solution to obtain a precipitate of a base-exchanging material.

6. In the manufacture of purifying materials, the process which comprises leaching with water an alkaline melt containing silica and alumina, dissolving alumina in a mother liquor from a previous operation, mingling the solution so produced with such leachings to produce a precipitate of base-exchanging material, and separating such precipitate to regain such mother liquor.

7. The process of making base-exchanging materials which comprises alternately dissolving an amphoteric oxid in an alkaline liquid and precipitating such oxid from such solution with a solution containing silica and alkali, the liquid after each such precipitation being used to dissolve more of such oxid.

8. The process of making base-exchanging materials which comprises alternately dissolving alumina in an alkaline liquid and precipitating such alumina from such solution with a solution containing silica and alkali, the liquid after each such precipitation being used to dissolve more alumina.

In testimony whereof, I affix my signature.

HEINRICH KRIEGSHEIM.

Witnesses:
MAURICE P. STACK,
SHENDAS NORTON.